United States Patent
Monahan et al.

[11] Patent Number: 5,827,143
[45] Date of Patent: Oct. 27, 1998

[54] TWO BELT OVER-RUNNING CLUTCH PULLEY

[75] Inventors: Russell E. Monahan, Ann Arbor; Jonathan M. Adler, Ypsilanti; Randall King, Ann Arbor; Scott A. Wojan, Novi, all of Mich.

[73] Assignee: NTN Corporation, Osaka, Japan

[21] Appl. No.: 869,199

[22] Filed: Jun. 4, 1997

Related U.S. Application Data

[60] Provisional application No. 60/032,644 Dec. 11, 1996.

[51] Int. Cl.$^6$ ................................ F16H 7/02; F16H 9/00
[52] U.S. Cl. ................................................ 474/73; 474/86
[58] Field of Search ................................ 474/32, 35, 73, 474/74, 84, 86

[56] References Cited

U.S. PATENT DOCUMENTS

| | | |
|---|---|---|
| 2,860,519 | 11/1958 | Cavanaugh ........................... 474/73 X |
| 2,910,891 | 11/1959 | Heckenthorn ........................... 474/86 |
| 3,059,493 | 10/1962 | Wolfram ........................... 474/86 X |
| 3,429,192 | 2/1969 | Allen ........................... 474/73 X |
| 4,296,717 | 10/1981 | Schlagmuller ........................... 474/86 X |
| 4,662,861 | 5/1987 | Seung et al. ........................... 474/86 |
| 4,867,768 | 9/1989 | Kitami et al. ........................... 474/86 |

Primary Examiner—Thomas R. Hannon
Attorney, Agent, or Firm—Harness, Dickey & Pierce, P.L.C.

[57] ABSTRACT

A variable speed drive device for mounting to a rotatable shaft and being driven by first and second belts. The device includes a first pulley of a first diameter and a second pulley of a second diameter, each engaging one of the belts. The first pulley mounts directly to the shaft via a mounting hub extending laterally therefrom. The second pulley is positioned radially outward of the hub and a bearing is located between the two. Also located between the two is a clutch mechanism that engages when the second pulley tries to rotates faster than the first pulley. In this manner, the first pulley drives the shaft at a first speed when the first pulley is rotating faster than the second pulley and the second pulley drives the shaft at a second speed when the second pulley is trying to rotate faster than the first pulley.

26 Claims, 4 Drawing Sheets

TWO BELT OVER-RUNNING CLUTCH PULLEY

CROSS REFERENCE TO RELATED APPLICATION

This application claims the benefit of provisional application Ser. No. 60/032,644, filed Dec. 11, 1996.

BACKGROUND OF THE INVENTION

1. Field of the Invention

This invention generally relates to over-running clutch pulleys and, more particularly, to an over-running clutch pulley which has particular application with a two belt, two speed engine accessory drive system.

2. Description of the Prior Art

During engine operation, a belt drive system is often used to power and operate the various accessory devices including, but not limited to, a power steering pump, a water pump, an air conditioning compressor, and an alternator which provides electrical power to the vehicle. While several type of belt drive systems are currently in use, the most popular system is a single belt, serpentine drive system.

Single belt serpentine drive systems typically include a ribbed belt which is trained about a drive pulley (connected to the crankshaft of the vehicle's engine) and one or more driven pulleys. The driven pulleys are in turn connected to the input shafts of the various devices mentioned above. An automatic belt tensioner is also typically provided in order to maintain the proper tension on the belt and prevent slipping.

Most driven pulleys are provided with a one-piece design. These pulleys are rigidly mounted to rotate with the accessory's input shaft. As a result, the belt provides a single driven speed which is based on the ratio of the effective diameters of the driving and driven pulleys. At low engine speeds, slow rotation can result in inadequate electrical output by the alternator, especially with the increased electrical load requirements of today's luxury vehicles (a result of such items as front and rear defrosters, power seats, mirrors and windows, high intensity headlamps, etc.).

The current solution to low alternator output is to reduce the diameter of the alternator pulley. This has the effect of running the alternator at a higher ratio, therefore running the alternator faster at lower speeds. At higher engine speeds, however, the top end alternator speed is increased and this results in excessive noise, heat and wear, especially on the alternator bearings.

When the input shaft of the accessory device is running at high speed (up to 22,000 rpm for an alternator), a significant amount of inertia builds within the accessory device. In normal driving situations, the drive belt will inherently experience instances of large deceleration, such as during in a 1–2 upshift during open throttle acceleration. This situation is made aggravated if the throttle is closed or "backed out" immediately after the transmission shifts. In that situation, the belt decelerates very quickly while the pulley, with the high inertia from the accessory, keeps rotating at a high rate, in spite of the friction between the pulley and the belt. As a result of the combined inertia and the lack of over-running capabilities, slippage between the pulley and the belt will occur if the belt decelerates too quickly. If significant slipping of the belt occurs, an audible squeal or squeak will be produced. Not only is a squealing belt annoying from an auditory standpoint, but it is also undesirable from a mechanical standpoint since it produces undue wear on the belt itself.

In attempting to eliminate belt slipping and the related problems, various design proposals have been put forward. One proposed design includes the use of higher belt tensions. However, in these designs the belt has been found to wear quicker than if slipping did occur. Additionally, with higher tensions, the bearings of the accessory's input shaft have shown increased wear and a reduced service life.

Other attempts to cure the belt slipping and squeal have resulted in constructions where the driven pulley exhibits a "one-way, over-running" capability. This capability allows the accessory's input shaft to over-run the driven pulley during belt deceleration and therefore accommodates the inertia built up within the accessory itself. U.S. Pat. Nos. 4,725,259; 5,139,463, 5,156,573, and 5,598,913 all disclose one-way, over-running clutch pulley constructions.

The prior art clutch pulleys may operate adequately in some respects, but they have drawbacks in other respects. While they overcome the problem of sudden belt deceleration and squeal, the problem of excessively high, top end rotation speed remains.

In view of the foregoing limitations and shortcomings of the prior art, as well as other disadvantages not specifically mentioned above, it should be apparent that there still exists a need for an improved one-way, over-running clutch pulley.

It is therefore a primary object of this invention to fulfill that need by providing a one-way over-running clutch pulley which overcomes the limitations and shortcomings of the prior art.

Another object of this invention is to provide an over-running clutch pulley which allows for two speed running of an accessory.

It is also an object of this invention to provide a clutch pulley which accommodates large decelerations of the belt so as to reduce or eliminate the belt squeal.

SUMMARY OF THE INVENTION

Briefly described, these and other objects of the invention are accomplished according to the present invention by providing a two belt over-running clutch pulley that is intended to be mounted to the rotational input shaft of an accessory device, such as the alternator of an automotive vehicle. While the clutch pulley of the present invention is being specifically discussed in connection with automotive vehicles, it will readily be seen to have general applicability in a wide range of situations, particularly those situations where it is desirable to maintain operation of the input device within a given speed range which would otherwise be exceeded if a single belt drive system were to be employed.

The present invention operates in a two belt accessory drive system which features a standard serpentine drive belt and a second, clutchable drive belt. The second drive belt is driven off of a second drive pulley mounted to one of the other accessories (i.e. water pump) or the crank shaft itself.

The clutch pulley itself includes two pulleys of differing diameters. These pulleys are respectively referred to as an inboard pulley and an outboard pulley, the inboard and outboard designations being relative to the accessory device. The outboard pulley has a smaller diameter of the two and is integrally formed with a hub. The hub extends axially away from the outboard pulley, generally in the direction of the accessory device, and is for mounting the present invention directly to the shaft of the accessory device. The inboard pulley is mounted and located radially outward from the hub, adjacent to the outboard pulley.

In mounting the inboard pulley to the hub, a clutch/bearing assembly is incorporated between the two. The clutch/bearing assembly operates as both a bearing means for rotatably mounting the inboard pulley to the hub and a clutch means for allowing one-way rotation of the inboard pulley relative to the hub and the outboard pulley.

During normal operation, an electromagnetic clutch associated with the second or auxiliary drive pulley mentioned above is disengaged allowing the first or standard serpentine belt to drive the alternator through the inboard pulley of the present invention. Since the second drive belt is not being driven, the inboard pulley leads the outboard pulley and the one-way clutch mechanism between the inboard pulley and the hub engages permitting the standard serpentine belt to drive the system. The alternator speed attained under this circumstance is somewhat lower than the corresponding speed of the prior art utilizing a single speed alternator pulley. This is because of the inherently larger diameter of the present invention's inboard pulley compared with the diameter of a standard, single belt pulley. The increase in diameter of the present invention inboard pulley operates to lower peak alternator speeds thereby reducing noise and wear.

At low engine speeds, the larger diameter of the inboard pulley results in the inboard pulley being driven at speeds too slow for the electrical load required in the vehicle. In these situations, the electromagnetic clutch associated with the auxiliary drive pulley is actuated, driving the second serpentine belt. This second belt in turn drives the outboard pulley of the present invention. Since the outboard pulley has a diameter which is less than that of the inboard pulley, the outboard pulley rotates at a greater rate and is permitted to over-run the larger inboard pulley through the one-way clutch mechanism. The alternator is therefore driven at higher speeds, speeds which are sufficient for the required electrical loads, even at reduced engine speeds.

By choosing the appropriate diameters for the inboard and outboard pulleys, as well as the primary and alternate drive pulleys, reduced high end alternator speeds can be achieved while still providing sufficient electrical output at lower engine speeds, such as idle.

The present invention further includes integral mechanisms for locating and fastening the clutch pulley to the alternator shaft. These include a pilot hole, and a threaded bore in the hub as well as a unitarily formed hex-head or other drive means to aid in the mounting process. The support bearing and one-way clutch mechanisms could also alternatively be provided as individual components instead of the combined clutch bearing mentioned above. Furthermore, the inner and outer races of the support bearing and one-way clutch mechanism can be formed unitarily with the inboard and outboard pulleys reducing the number of individual components required in the present invention.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
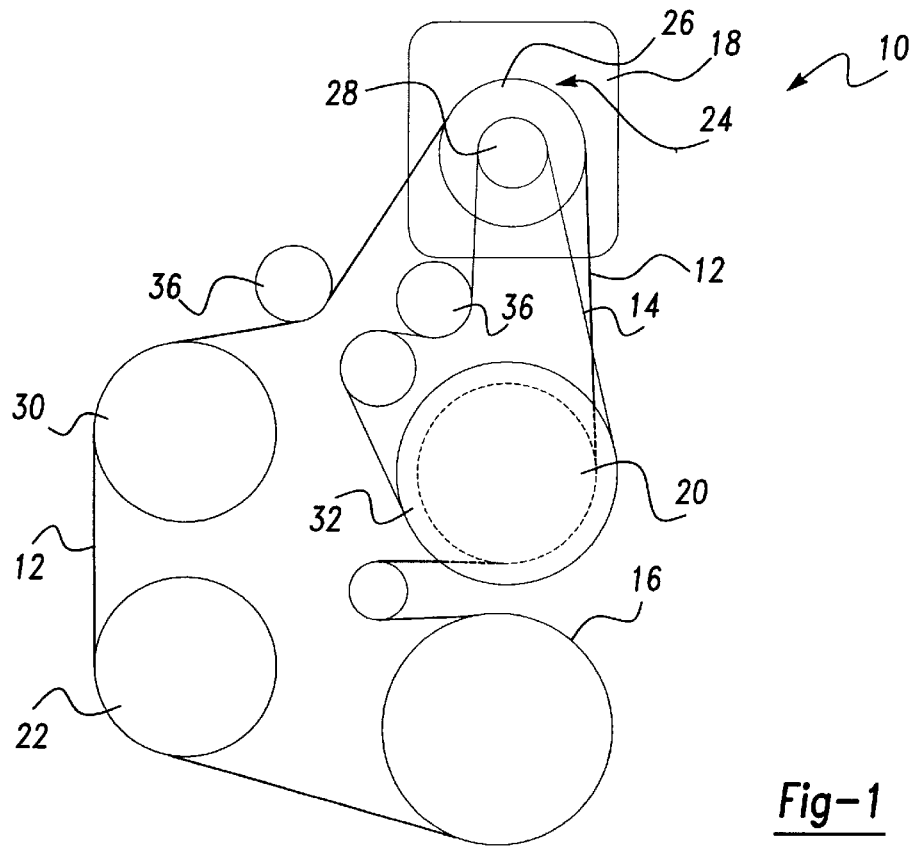
FIG. 1 is a schematic illustration of a two belt accessory drive system incorporating the principles of the present invention.
Figure 2:
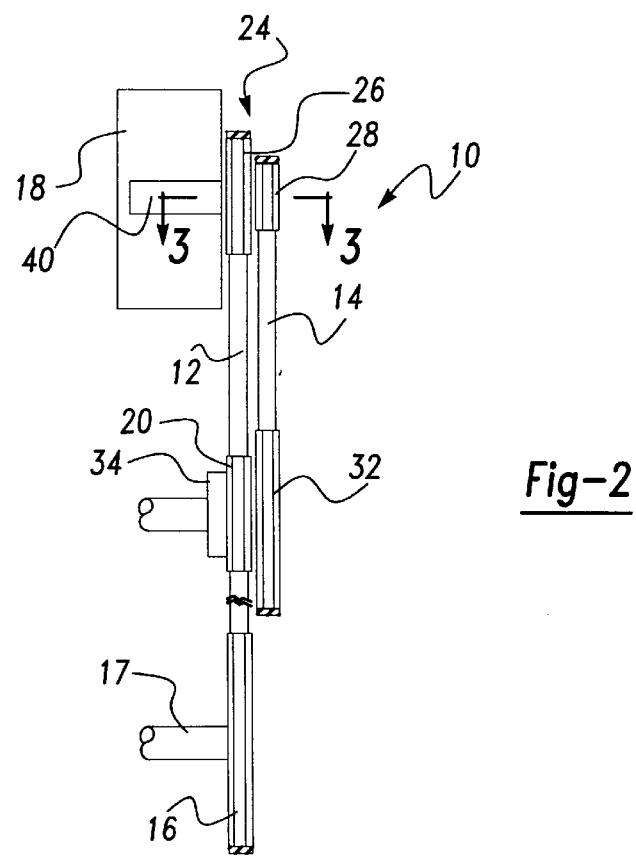
FIG. 2 is a side elevational view of the two belt accessory drive system illustrated in FIG. 1.

Referring now to the drawings, FIGS. 1 and 2 illustrate a two belt, two speed accessory drive system, generally designated at 10, incorporating the principles of the present invention. Generally, the drive system 10 includes a first or standard serpentine accessory drive belt 12 and a second or clutchable drive belt 14.

The first drive belt 12 is driven off a crank shaft pulley 16 which is mounted to rotate with the crank shaft 17 of the internal combustion engine. Being driven by the crank shaft pulley 16, the first drive belt 12 operates as the input or drive belt for the various accessories associated with the engine of the motor vehicle. As seen in FIGS. 1 and 2, the first drive belt 12 is utilized as the input to power a water pump through a water pump pulley 20, an air conditioning compressor through an air condition compressor pulley 22, an alternator 18 through an alternator pulley 24, and a power steering pump through a power steering pump pulley 30. The alternator pulley 24 further includes inboard and outboard pulleys 26, 28 and the first drive belt 12 is trained only about the inboard pulley 26 while the second drive belt 14 is utilized with the outboard pulley 28.

Trained about the outboard pulley 28 of the alternator pulley 24, the second drive belt 14 is also trained about and driven by an auxiliary, clutchable pulley 32. When engaged, the clutchable pulley 32 rotates with the water pump pulley 20. In order to engage and disengage the clutch pulley 32, an electromagnetic clutch 34 of well known and conventional construction is utilized and associated with the water pump pulley 20 and the clutchable pulley 32. Accordingly, when engaged by the electromagnetic clutch 34, the clutchable pulley 32 rotates with the water pump pulley 20.

In order to ensure that neither the first drive belt 12 nor the second drive belt 14 slips relative to any of the pulleys 20–32, belt tensioners 36 engage the belts 12 and 14 creating the proper tension. Such tensioners 36, being well known and of common construction, are therefore not described further herein.

The alternator pulley 24 will now be described in greater detail with reference to FIG. 3. The alternator pulley 24 includes three major components: the inboard pulley 26, the outboard pulley 28 and a bearing/clutch assembly 38 operable between the two.

In order to mount the alternator pulley 24 to the alternator 18 and more specifically to an input shaft 40 of the alternator 18, the outboard pulley 28 is unitarily formed with a mounting hub 42. The hub 42 is an inboard lateral extension off of a sheave 44 whose outer surface defines one or a series of V-grooves 46 adapted to receive the second drive belt 14.

Centrally defined in the hub 42 is a bore 48 whose axis 50 corresponds with the axis of the input shaft 40. The bore 48 is formed with a pilot hole 52 to accurately locate the alternator pulley assembly 24 on the input shaft 40 and further includes threads 54 which engage corresponding threads 56 formed on the input shaft. To further assist in mounting the alternator pulley assembly 24 to the input shaft 40, a male or female hex head 58 or other male or female driving means is unitarily formed in an outboard radial face 60 of the outboard pulley 28. As such, the pulley assembly 24 of the present invention is specifically designed for use with current alternator designs and alternator assembly procedures without the need for modifications to the alternator or the assembly fixtures.

The inboard pulley 26 is formed as a sheave 66 having an inner cylindrical surface 68 and one or a series of V-grooves 70 in its outer surface. As with the outboard pulley 28, the V-grooves 70 of the inboard pulley receive a drive belt, specifically the first drive belt 12. As more fully discussed below, the effective diameter 62 of the inboard pulley 26 is greater than the effective diameter 64 of the outboard pulley 28.

The inner cylindrical surface 68 of the inboard pulley 26 likewise defines a diameter which is greater than an outer cylindrical surface 72 of the hub 42. Provided as such, the inboard pulley 26 is mounted to the hub 42 and located radially outward of the outer cylindrical surface 72.

In mounting the inboard pulley 26 to the hub 42, a rolling element bearing 74 is provided between the inner cylindrical surface 68 of the sheave 66 and the outer cylindrical surface 72 of the hub 42 to permit relative rotation. Accordingly, the outer race 76 and the inner race 78 of the bearing 74 are respectively mounted (via a press-fit engagement, use of snap rings, use of an adhesive or other mounting methods) into engagement between the above two mentioned cylindrical surfaces 68, 72. Also located between and assisting in mounting the inboard pulley 26 to the hub 42 is a clutch mechanism 80. In the embodiment of FIG. 3, the clutch mechanism 80 is separate from and located axially inboard of the bearing 74. The clutch mechanism 80 is a one-way clutch and is of one of the various well known constructions. As illustrated in this first embodiment, the clutch mechanism 80 includes a series of roller elements 82 between an outer race 84 and an inner race 86 with the races 84 and 86 being mounted (as discussed above) into engagement between the inner and outer cylindrical surfaces 68, 72 similar to that of the bearing 74. Additionally, one of the races 84, 86 is formed with a ramped surface detail (not shown) such that movement of the roller element 82 in one direction (driving) along that surface eventually causes the roller element 82 to wedge and lock between the races 84, 86 and allowing the inboard pulley 26 to drive the outboard pulley 28 and therefore the input shaft 40 of the alternator 18. In the present invention, when the inboard pulley 26 attempts to over-run the outboard pulley 28, the clutch mechanism 80 engages. As an alternative to the roller ramp construction of the clutch mechanism 80, a sprag construction could be utilized. The bearing 74 and the clutch mechanism 80 are further provided with seals 88 in customary manner on their axial ends so as to prevent the introduction of contaminants or other foreign matter into the working elements of the bearing 74 and the clutch mechanism 80.

During normal operation of the two belt drive system 10, the electromagnetic clutch 34 is disengaged. This allows the first drive belt 12 to drive the alternator 18 through the inboard pulley 26 because of the lock-up of the clutch mechanism 80. In most cases, the alternator speed attained under these circumstances will be lower than the corresponding speed of the prior art single pulley alternator construction. This is because of the larger diameter 62 defined by the inboard pulley 26 as compared to diameters commonly found on standard, single belt pulleys. The change in diameter for the inboard pulley 26 therefore lowers the peak alternator speed and also reduces noise and wear on the alternator 18.

At low engine speeds, such as when the vehicle is idling, the alternator speed may, if driven by the inboard pulley 26, be too slow for the electrical requirements of the vehicle. Therefore, the electromagnetic clutch 34 on the water pump and water pump pulley 20, in the illustrated example, is actuated causing the second drive belt 14 to be driven by the clutchable pulley 32. By virtue of the diameter of the clutchable pulley 32 and the effective diameter 64 of the outboard pulley 28, the outboard pulley 28 over-runs the inboard pulley 26 releasing the clutch mechanism 80 in providing a higher and more appropriate alternator speed at low engine speed. A greater electrical output is accordingly achieved at lower engine speeds. By choosing the appropriate diameters for the crank shaft pulley 16, the water pump pulley 20, the clutchable pulley 32, the inboard pulley 26 and the outboard pulley 28, appropriate speed ranges for driving the inboard and outboard pulleys 26, 28 can be provided for the entire range of engine operation.

Figure 4:
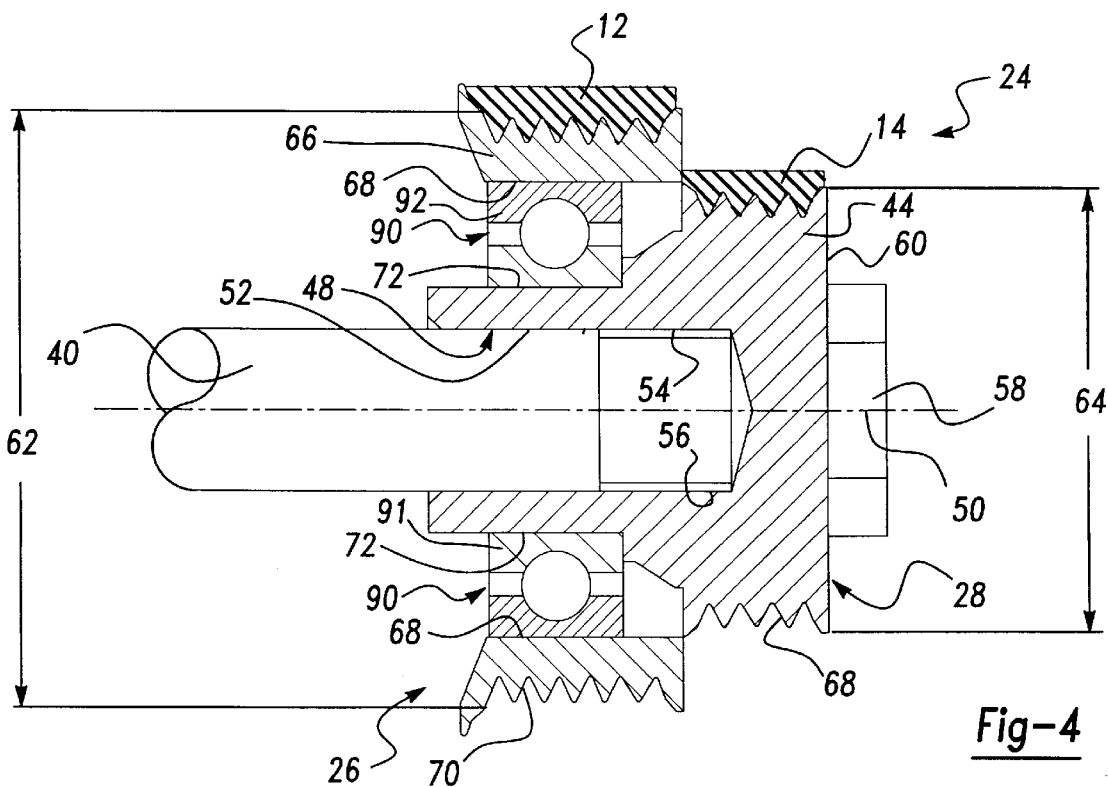
FIGS. 4–6 are further embodiments of clutch pulley assemblies according to the principles of the present invention.
Figure 5:
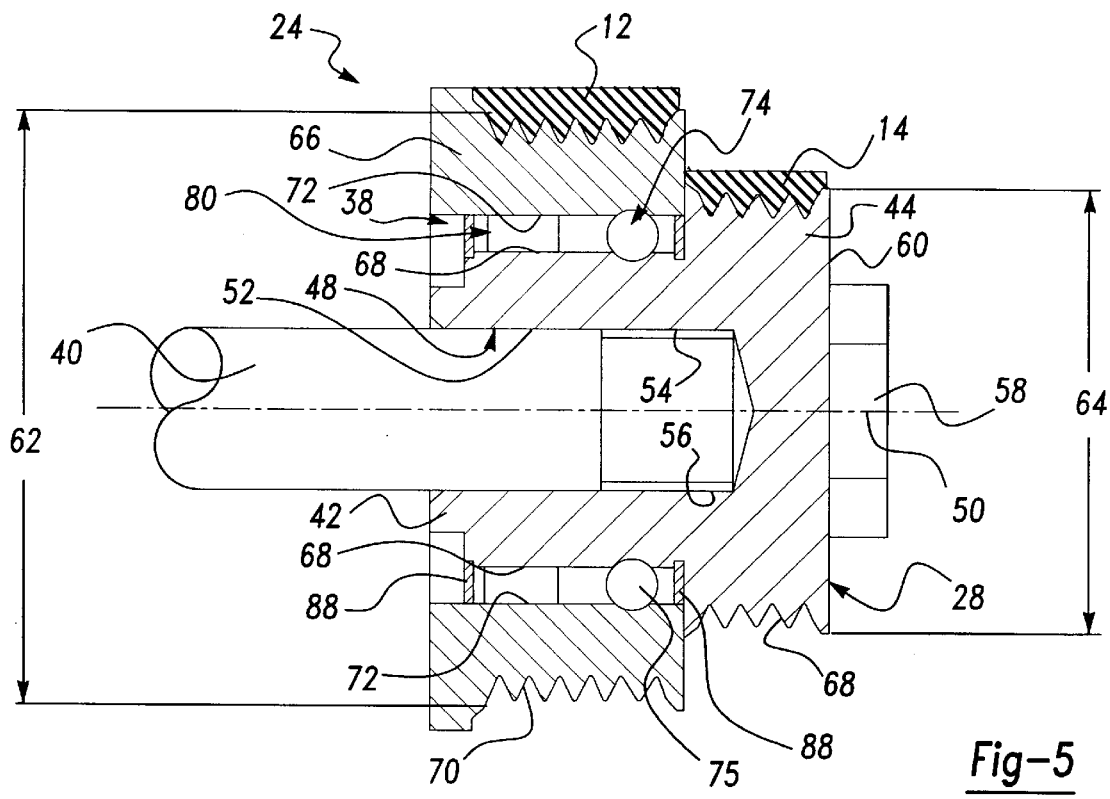
Figure 6:
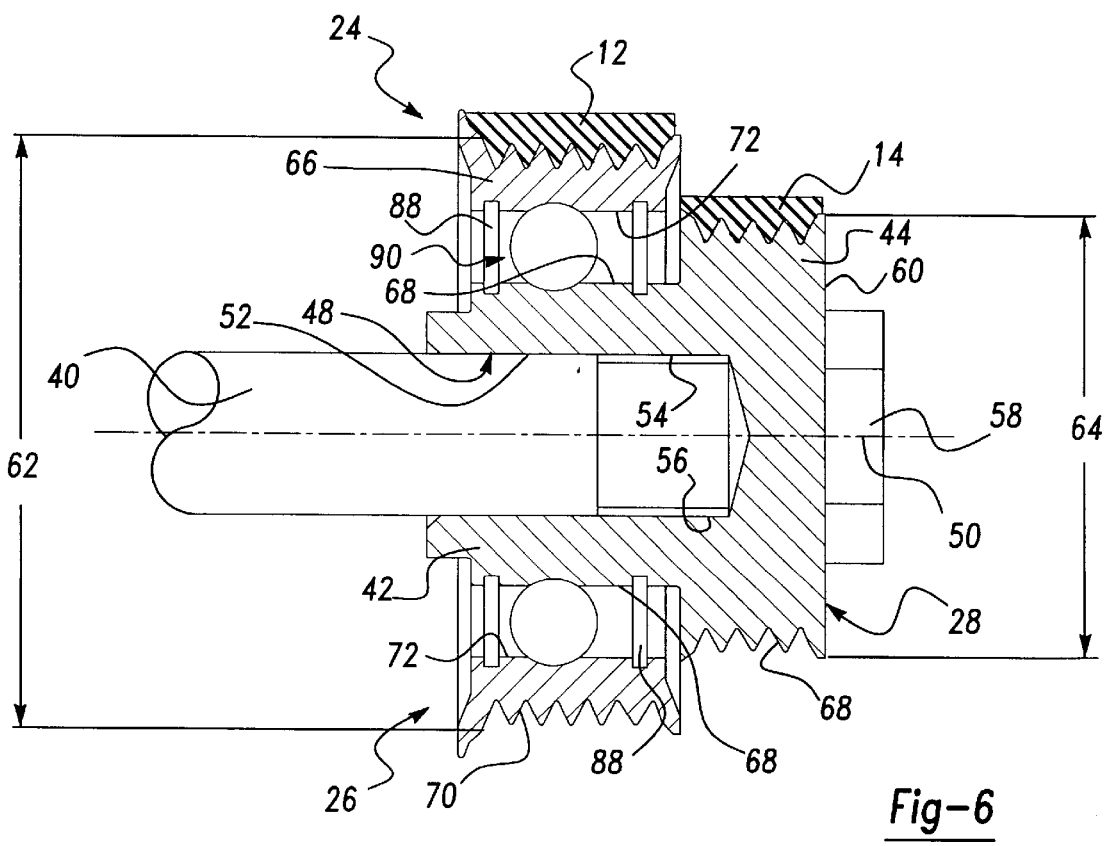

FIGS. 4, 5 and 6 illustrate additional embodiments of the present invention. Where these further embodiments have elements common with the previously discussed embodiments, like item numbers have been utilized as a matter of convenience.

Figure 3:
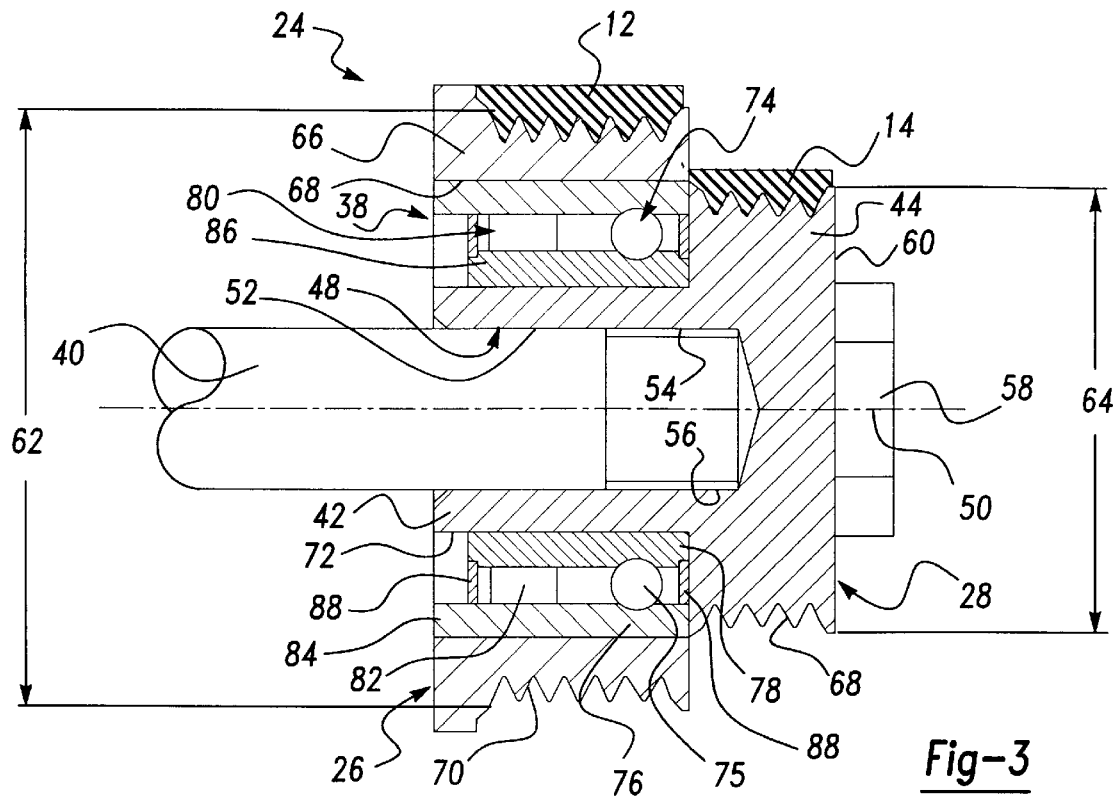
FIG. 3 is a cross sectional view taken substantially along line 3—3 in FIG. 2 of a clutch pulley assembly embodying the principles of the present invention.

The embodiment of FIG. 4 is substantially the same in its construction as the embodiment presented in FIG. 3. However, instead of a separate bearing 74 and clutch mechanism 80, an integral clutch/bearing combination, designated at 90, is used between the inner cylindrical surface 68 of the inboard pulley 26 and the outer cylindrical surface 72 of the hub 42.

FIG. 5 is similar to the embodiment of FIG. 3 in that includes separate bearings 74 and clutch mechanisms 80. However, unlike the previously discussed embodiment, the inner and outer races 78,76 and 86, 84 of the bearings 74 and the clutch mechanisms 80 are unitarily formed as the inner and outer cylindrical surfaces 68, 72 of the inboard pulley 26 and the hub 42.

Likewise in FIG. 6, the inner and outer races 78, 76 and 86, 84 are unitarily formed by the inner and outer cylindrical surfaces 68 and 72. The embodiment of FIG. 6, however, differs from the embodiment of FIG. 5 in that an integral clutch bearing mechanism 90 is incorporated between the unitary races being defined by the inner and outer cylindrical surface 68 and 72.

Figure 7:
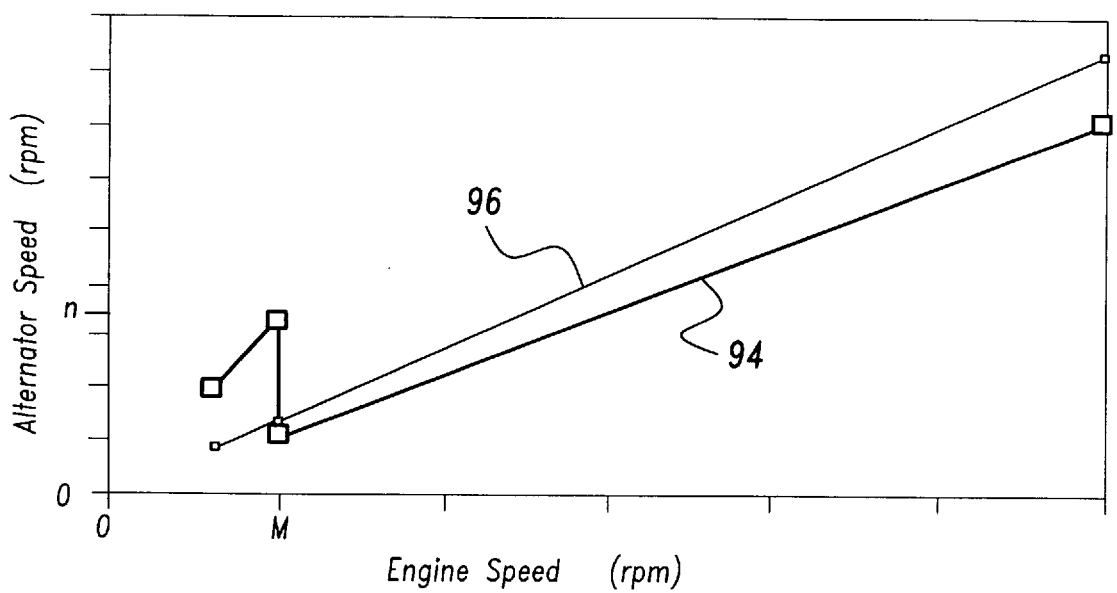
FIG. 7 is an alternator speed vs. engine speed graph illustrating the running speeds of a clutch pulley according to the present invention relative to a single speed clutch pulley according to the prior art.

As seen in FIG. 7, the two belt drive system 10 and alternator pulley assembly 24 of the present invention can be seen as providing for reduced alternator top end speed, as well as for increased alternator speed during low engine speed. The general speed plot for the alternator speed vs. engine speed of the present invention is designated at 94 while a speed plot for a prior single belt system is designated at 96. Obviously, the specific diameters selected for the crankshaft pulley 16, the inboard and outboard pulleys 24, 26 and the clutchable pulley 32, which will be indicated by the particular engine and accessory parameters, will cause the speed plot to conform to specified speed ranges. The general shape of the speed plot, however, will remain as in FIG. 7.

While the above description constitutes the preferred embodiment of the present invention, it will be appreciated that the invention is susceptible to modification, variation and change without departing from the proper scope and fair meaning of the accompanying claims.

We claim:

1. A variable speed drive device for mounting to a rotatable shaft and being driven by first and second belts, said device comprising:

a first pulley of a first diameter, said first pulley including first belt engaging means for engaging the first belt, said first pulley also including shaft mounting means for mounting said first pulley to the shaft, said shaft mounting means laterally extending off of said first belt engaging means;

a second pulley of a second diameter, said second pulley including second belt engaging means for engaging the second belt, said second pulley located radially outward of said shaft mounting means;

a bearing positioned between said second pulley and said shaft mounting means, said bearing rotatably mounting said second pulley to said first pulley;

a clutch mechanism positioned between said second pulley and said shaft mounting means, said clutch mechanism engaging when said second pulley is rotating at a rate greater than said first pulley, said clutch mechanism thereby permitting one-way rotation of said second pulley relative to said first pulley; and whereby said first pulley drives the shaft at a first speed when the first pulley is rotating faster than the second pulley and the second pulley driving said shaft at a second speed when the second pulley is attempting to rotate faster than the first pulley.

2. A device as set forth in claim 1 wherein said bearing and said clutch mechanism are integrally formed with one another.

3. A device as set forth in claim 1 wherein said bearing and said clutch mechanism are a one-way clutch bearing.

4. A device as set forth in claim 3 wherein said clutch bearing is a roller/ramp clutch bearing.

5. A device as set forth in claim 3 wherein said clutch bearing is a sprag clutch bearing.

6. A device as set forth in claim 3 wherein said clutch bearing includes an inner race and an outer race, said inner race being unitary with said shaft mounting means.

7. A device as set forth in claim 3 wherein said clutch bearing means includes an inner race and an outer race, said outer race being unitary with said second pulley.

8. A device as set forth in claim 3 wherein said clutch bearing means includes an inner race and an outer race, said inner race being unitary with said first pulley and said outer race being unitary with said second pulley.

9. A device as set forth in claim 1 wherein said shaft mounting means and said first belt engaging means are unitarily formed with one another.

10. A device as set forth in claim 1 wherein said second pulley is immediately adjacent to said first pulley belt engaging means.

11. A device as set forth in claim 1 wherein said first diameter is less than said second diameter.

12. A device as set forth in claim 1 wherein said shaft mounting means includes a hub, portions of said hub defining a bore within said hub, said bore having a threaded portion to receive a threaded end of the shaft.

13. A device as set forth in claim 1 wherein said first pulley has unitarily formed thereon driving means for driving said shaft mounting means into engagement with the shaft.

14. A variable speed accessory drive system for an engine, said system comprising:

an output shaft being rotated by the engine;

first and second drive pulleys mounted to said output shaft and said second drive pulley rotating with said output shaft;

clutch means for selectively engaging said first drive pulley to rotate with said output shaft;

a first belt trained about said first drive pulley;

a second belt trained about said second drive pulley;

a rotatable accessory input shaft;

a first driven pulley having a first diameter, said first driven pulley including a first sheave engaging said first belt, said first driven pulley including a shaft mounting hub mounting said first driven pulley to said input shaft, said shaft mounting hub laterally extending off of said first sheave;

a second driven pulley having a second diameter, said second driven pulley including a second sheave engaging said second belt, said second pulley located radially outward of said shaft mounting hub;

a bearing positioned between said second driven pulley and said shaft mounting hub, said bearing permitting relative rotation between said second driven pulley to said first driven pulley;

a clutch mechanism positioned between said second driven pulley and said shaft mounting hub, said clutch mechanism engaging when said second driven pulley is rotating at a rate greater than said first driven pulley and thereby permitting one-way relative rotation between said second driven pulley and said first driven pulley; and whereby said first driven pulley drives said input shaft at a first speed when said first pulley is rotating faster than said second pulley and said second pulley drives said input shaft at a second speed when said second pulley is attempting to rotate faster than said first pulley.

15. A device as set forth in claim 14 wherein said bearing and said clutch mechanism are integrally formed with one another.

16. A device as set forth in claim 14 wherein said bearing and said clutch mechanism are a one-way clutch bearing.

17. A device as set forth in claim 16 wherein said clutch bearing is a roller/ramp clutch bearing.

18. A device as set forth in claim 16 wherein said clutch bearing is a sprag clutch bearing.

19. A device as set forth in claim 16 wherein said clutch bearing includes an inner race and an outer race, said inner race being unitary with said shaft mounting means.

20. A device as set forth in claim 16 wherein said clutch bearing means includes an inner race and an outer race, said outer race being unitary with said second pulley.

21. A device as set forth in claim 16 wherein said clutch bearing means includes an inner race and an outer race, said inner race being unitary with said first pulley and said outer race being unitary with said second pulley.

22. A device as set forth in claim 14 wherein said shaft mounting means and said first belt engaging means are unitarily formed with one another.

23. A device as set forth in claim 14 wherein said second pulley is immediately adjacent to said first pulley belt engaging means.

24. A device as set forth in claim 14 wherein said first diameter is less than said second diameter.

25. A device as set forth in claim 14 wherein said shaft mounting means includes a hub, portions of said hub defining a bore within said hub, said bore having a threaded portion to receive a threaded end of the shaft.

26. A device as set forth in claim 14 wherein said first pulley has unitarily formed thereon driving means for driving said shaft mounting means into engagement with the shaft.

* * * * *